Feb. 13, 1968   J. M. ROBINSON   3,368,449
TOOL POSTS FOR LATHES
Filed Oct. 11, 1965   2 Sheets-Sheet 1
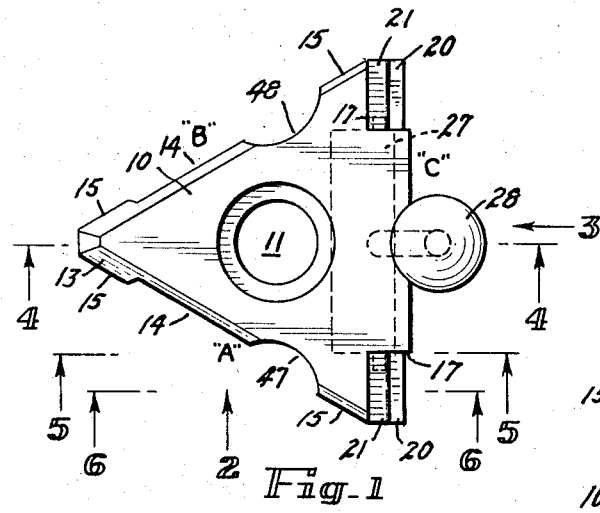
Fig_1
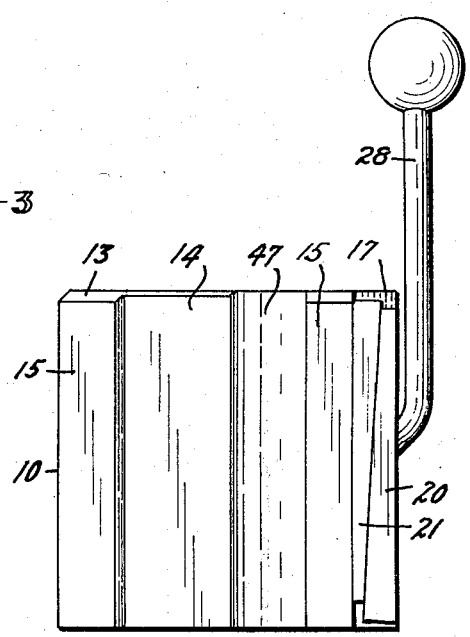
Fig_2
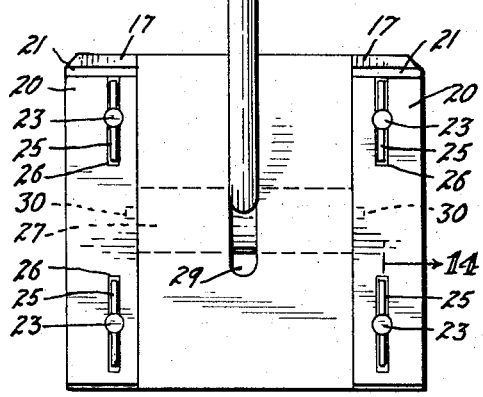
Fig_3
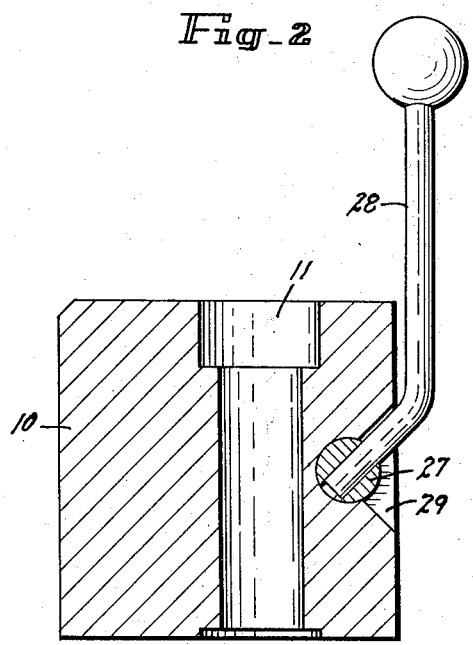
Fig_4
Fig_14
INVENTOR.
JESSE M. ROBINSON
BY
ATTORNEY Feb. 13, 1968    J. M. ROBINSON    3,368,449

TOOL POSTS FOR LATHES

Filed Oct. 11, 1965    2 Sheets-Sheet 2

INVENTOR.
JESSE M. ROBINSON
BY
ATTORNEY

United States Patent Office 3,368,449
Patented Feb. 13, 1968

3,368,449
TOOL POSTS FOR LATHES
Jesse M. Robinson, 2118 S. Kalamath,
Denver, Colo. 80223
Filed Oct. 11, 1965, Ser. No. 494,843
5 Claims. (Cl. 82—36)

ABSTRACT OF THE DISCLOSURE

A solid metallic block having a equilateral-triangular horizontal cross-section adapted to be mounted for rotation about its vertical axis upon a lathe cross slide and provided with an elongated double-ended tool holder having hooked portions at its extremities which can be hooked about the triangular corner edges of a selected face of said block to support said holder horizontally across said face, said block being provided with means for adjustably presetting the vertical position of said holder thereon and with expanding elements which can be expanded against said hooked portions to lock said holder in the preset vertical position.

---

This invention relates to a tool post and tool holder for use on lathes.

The principal object of the invention is to provide a tool post to be mounted on the cross slide of a conventional metal working lathe and to provide tool holders for use with the improved post which will enable a plurality of different cutting bits to be preset in the holders in advance so that workpieces can be continuously and accurately repeated by simple interchange of the preset holders on the post.

Another object of the invention is to provide a vertical tool post which will be triangular in horizontal cross section so that it can be rotatably mounted on a lathe cross slide with its vertical apex edge directed forwardly, toward the axis of the lathe, with two tool-holding faces extending rearwardly from the apex edge in flaring relation with each other so as to provide clearance when working with a close tail stock and to facilitate interchange of tools without necessitating backing out the cross slide.

A further object is to provide a reversible tool holder for the improved post in each extremity of which a different tool bit can be mounted and which will accurately and automatically present each bit to the work at the correct working height when that bit is directed toward the work.

A still further object is to provide means on a tool post for rapidly and efficiently clamping tool holders in chatter-proof relation to the post and quickly releasing them therefrom for accurate interchange when desired.

Other objects and advantages reside in the detail construction of the invention, which is designed for simplicity, economy, and efficiency. These will become more apparent from the following description.

The tool post of this invention consists of two cooperating parts, one of which will be herein referred to as a tool post and the other as a tool holder. In the following detailed description of the invention, reference is made to the accompanying drawing which forms a part hereof. Like numerals refer to like parts in all views of the drawing and throughout the description.

FIG. 1 is a top plan view of the tool post of this invention in the released or retracted position;

FIG. 2 is a side elevational view of the tool post looking in the direction of the arrow 2 in FIG. 1;

FIG. 3 is a rear elevational view of the post looking in the direction of the arrow 3 in FIG. 1;

Figure 11:
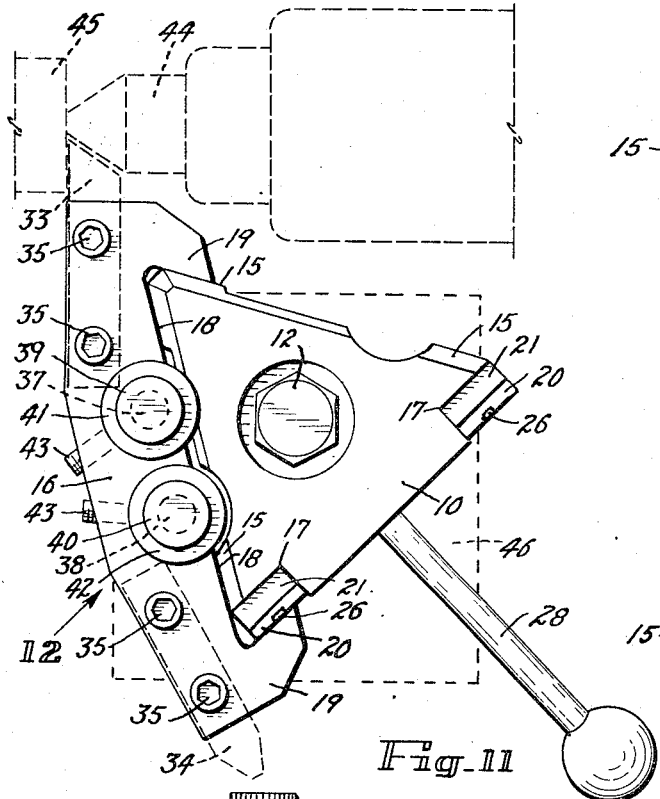
Figure 5:
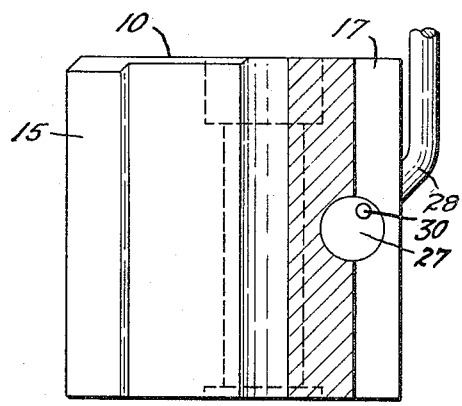
Figure 6:
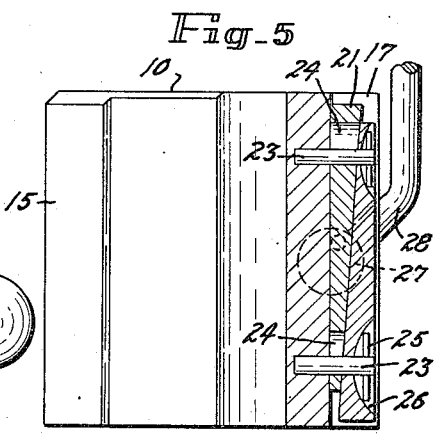
Figure 12:
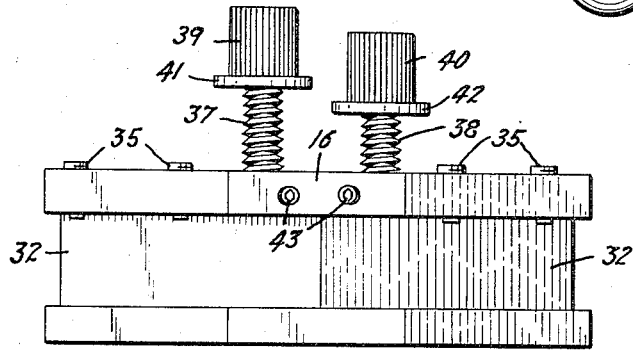
Figure 13:
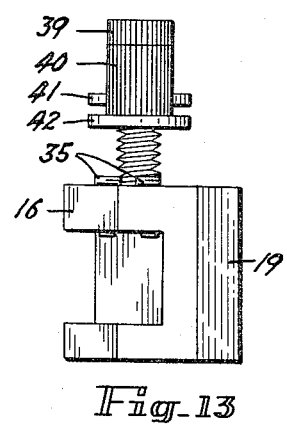
Figures 7, 8, 9, 10:
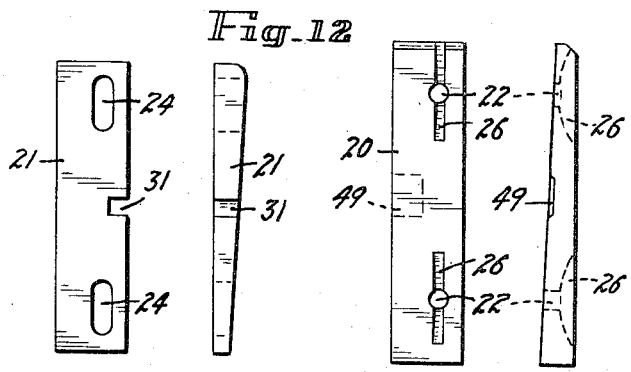

FIGS. 4, 5 and 6 are vertical sections of the tool post taken on the lines 4—4, 5—5, and 6—6, respectively, FIG. 1;

FIG. 7 is a detail face view of a wedge block, two of which are employed in the post, which will be later described;

FIG. 8 is a similar detail edge view of the block of FIG. 7;

FIG. 9 is a detail face view of an expansion strip, two of which are employed in the post;

FIG. 10 is a similar detail edge view of the expansion strip of FIG. 9;

FIG. 11 is a top plan view of the tool post showing a tool holder, to be later described, clamped in place thereon;

FIG. 12 is a detail elevational view of the tool holder, removed from the post, as it would appear looking in the direction of the arrow 12 in FIG. 11;

FIG. 13 is an end elevational view of the tool holder of FIG. 12; and

FIG. 14 is an enlarged, fragmentary, detail section taken on the line 14—14 FIG. 3.

Relative positions of conventional lathe elements are indicated in broken line in FIG. 11 and designated by numeral as follows: dead center 44, workpiece 45, and crosshead 46.

The tool post comprises a solid metallic block 10 having an equilateral-triangular horizontal cross-section so as to present a left angular face A, a right angular face B and a base face C. The height of the block is preferably substantially equal to the altitude of the triangular cross section. The block is provided with a vertical, centrically-located, counter-bored bore 11 for receiving a headed mounting screw, such as indicated at 12, by means of which the block can be secured on the cross slide of the lathe in any desired circumferential position.

The upper edges of the angular faces A and B are chamfered as indicated at 13, to improve the appearance and to reduce the possibility of injury, and the vertical medial portions of the angular faces are indented, as indicated at 14, to present two, accurately ground, vertical side lands 15 on each angular face to receive, guide and horizontally position a tool holder 16, such as shown in FIGS. 11, 12 and 13, thereon. The vertical side edges of the base face C are provided with accurate, vertical, 90°, corner notches 17.

The tool holder of this invention is an elongated bar-like yoke having a flat inner face 18 adapted to extend between and rest against the lands 15. The inner face 18 terminates at each of its extremities in dovetailed hooked portions 19 adapted to engage and fit against the vertical 60° corners of the block 10. The hooked portions are accurately ground at 60° to the inner face 18 and are drawn into accurate and secure contact with the corner lands 15 of the tool post by means of elongated expansion strips 20 and wedge strips 21, one of each of which is positioned in each of the corner notches 17 of the tool post.

The expansion strips 20 are shown in detail in FIGS. 9 and 10 and each comprises an elongated metallic strip of greater thickness at the bottom than at the top so as to present a vertical outer surface and an inclined inner surface. The strip is drilled as shown at 22 to slidably receive two guide studs 23 which are permanently fixed in the block 10 and which project horizontally rearward in the corner notches 17 in vertically spaced relation.

The wedge strips 21 are shown in detail in FIGS. 7 and 8 and each comprises a vertically elongated, metallic strip of greater thickness at the top than at the bottom so as to present vertical inner faces against the bottoms of the notches 17 and inclined outer faces against their respective expansion strips 20. The wedge strips are provided with vertically-elongated, stud openings 24 for the passage of the studs 23. The expansion strips 20 and the wedge strips 21 are maintained in place on the studs 23 in their respective corner notches 17 by resilient key pins 25 which extend radially and vertically through the studs 23 adjacent the outer extremities of the latter The key pins 25 are positioned in round-bottomed pin grooves 26 in the outer faces of the expansion strips 20. The round bottom of each pin groove 26 contacts the extremities of the key pin positioned therein a flex the latter outwardly, as shown in FIG. 14, to resiliently urge the expansion strips 20 against their respective wedge strips 21.

It can be seen, that if the two wedge strips are forced downwardly the two expansion strips will move outwardly. The downward movement is simultaneously imparted to the wedge strips 21 by means of a horizontally positioned cross shaft 27 which is rotatably mounted in the block 10 between the corner notches 17.

The shaft 27 is provided with a medially-positioned, radially-extending handle member 28 extending rearwardly through a vertically-elongated handle aperture 29 in the face C of the block 10 by means of which the shaft 27 may be manually rotated through a limited arc.

The shaft 27 is provided at each of its extremities with an eccentrically positioned crank boss 30. Each of the crank bosses 30 engage a notch 31 in the edge of one of the wedge strips 21 so that when the handle member 28 is rotated downwardly the two wedge strips will be simultaneously moved downwardly to urge the expansion strips 20 outwardly, against the bias of the flexing key pins 25, to clamp the dovetailed hooks 19 of the tool holder 16 at any desired vertical position against the lands 15 of the block 10. The expansion strips 20 are preferably provided with clearance notches 49 to provide free clearance for the rotation of the bosses 30.

The tool holder is provided with a tool channel 32 at each of its extremities into either of both of which desired tool bits, such as indicated in broken line at 33 and 34 (FIG. 11), can be locked by means of suitable set screws 35 and 36. The tool holder is also provided with two tool-presetting screws 37 and 38 which are threaded into the top of the tool holder in vertical parallel relation at equal disances at each side of the mid-pont of the holder. The presetting screws 37 and 38 are provided wih knurled, finger grip heads 39 and 40, respectively, which are in turn provided with circular stop flanges 41 and 42, respectively. The presetting screws 37 and 38 can be locked in any desired position by means of suitable set screws 43.

The presetting screw 37 is threaded into, or out of, the block 10 so that the flange 41 will rest upon the top of the block, as shown in FIG. 11, when the bit 33 is at the proper working elevation relative to the work piece 45. The screw 37 is then locked by its set screw 43. Now each time the tool holder is placed on the tool post, with the bit 33 forward, it will drop to the proper preset position without attention so that when the handle 28 is moved to the clamping position the bit 33 will be in its exact preset position for repetitive work due to the contact of the flange 41 with the top of the block.

The flange 42 of the presetting screw 38 cannot contact the top of the block 10 when the bit 33 is positioned forwardly for the face A of the block is provided with a vertical semicircular passage 47 which allows the flange 42 to pass freely downwardly.

Now let us assume it is desired to preset the bit 34 for repetitive work. The handle member 28 is released, the yoke 16 is lifted from the block 10 and rotated, in a horizontal plane, slid downwardly on the face B of the block with the bit 34 directed toward the work piece 45. The flange 42 of the presetting screw 38 will now contact the top of the block 10 and the screw 38 is adjusted and locked to position the bit at the proper working height. The preset of the first screw 37 is not disturbed since the face B also is provided with a semicircular vertical passage 48 which allows free vertical movement of the first flange 41. Therefore, the holder 16 will automatically drop to the proper preset position on either of the faces A or B for repetitive work without attention. Horizontal adjustments are conventionally accomplished by shifting the cross head 46 and the tool post thereon. The bits may have any desired shapes depending upon the job being done.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A tool post for lathes comprising:
   (a) a vertical metallic block having a triangular horizontal cross section with two angular sides and a base side;
   (b) means for rotatably mounting said block on an element of a lathe;
   (c) an elongated tool holding yoke adapted to be positioned horizontally across either of said angular sides;
   (d) a hook element formed on each extremity of said yoke and adapted to grip the vertical side edges of either of said angular sides;
   (e) means for mounting a turning tool at each extremity of said yoke;
   (f) means in said block for manually increasing the width of said angular sides within the confine of said hook elements;
   (g) a presetting screw threaded into the top of said yoke;
   (h) a flange projecting from the head of said screw and adapted to engage said block to limit the downward movement of said yoke thereon;
   (i) a second similar flanged presetting screw threaded downwardly into said yoke, said screws being positioned on opposite sides of and equally spaced from the midpoint of said yoke;
   (j) a first vertical passage in one of said angular sides for allowing free downward passage of the flange of one of said screws; and
   (k) a second vertical passage in the other of said angular sides for allowing free downward passage of the other of said screws.

2. A tool post as described in claim 1 in which the means for increasing the width of said triangular sides comprises:
   (a) a vertical wedge strip and an adjacent vertical expansion strip positioned at each vertical edge of said base side, each of said wedge strips having a wedge-like face in slidable contact with a similar face on the adjacent expansion strip;
   (b) means for preventing vertical movement of said expansion strips; and
   (c) means for simultaneously moving said wedge strips vertically relative to said expansion strips for urging the latter outwardly from said block.

3. A tool post as described in claim 2 in which the means for simultaneously moving said wedge strips comprises:
   (a) a cross shaft rotatably mounted in said block and extending between said wedge strips;
   (b) means for manually rotating said shaft; and
   (c) eccentrically-positioned means on the extremities of said cross shaft in engagement with said wedge strips for moving the latter vertically in consequence of the rotation of said shaft.

4. A tool post as described in claim 3 having:
   (a) resilient means urging said expansion strips into contact with said wedge strips.

5. A tool post as described in claim 4 in which the resilient means comprises:
   (a) guide studs extending from said post through said wedge strips and through said expansion strips;
   (b) a resiliently flexible retaining pin extending through each guide stud adjacent the outer extremity and in contact with the adjacent expansion strip and arranged to be flexed in consequence of outward movement of said expansion strips.

References Cited

FOREIGN PATENTS

| | | |
|---|---|---|
| 619,186 | 3/1949 | Great Britain. |
| 1,070,864 | 2/1954 | France. |
| 572,112 | 1/1958 | Italy. |
| 1,216,264 | 11/1959 | France. |

LEONIDAS VLACHOS, *Primary Examiner.*